Feb. 20, 1962  S. N. BUCHANAN  3,022,485
ELECTRICAL WIRING UNIT
Filed Oct. 8, 1956  4 Sheets-Sheet 1
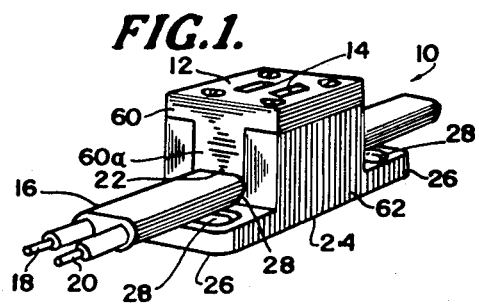
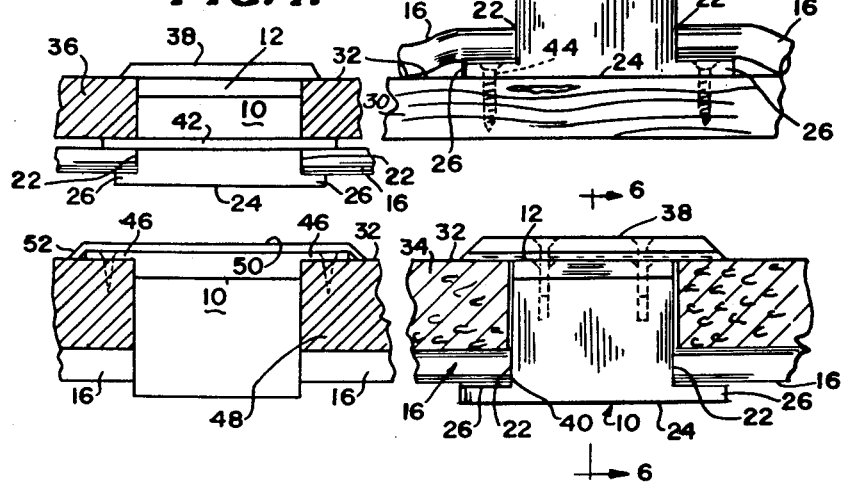
INVENTOR.
Stephen N. Buchanan
BY
Cushman, Darby & Cushman
Attorneys

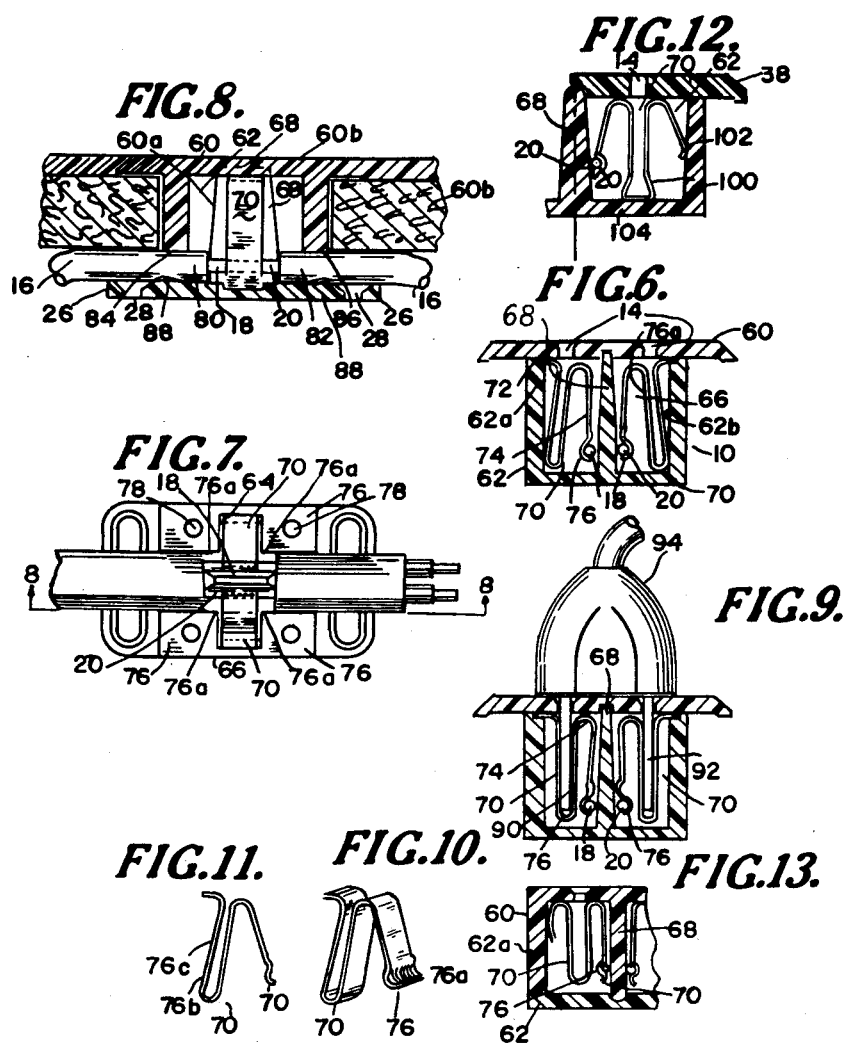

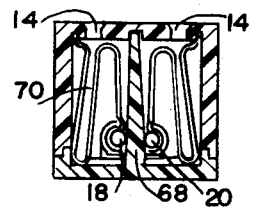
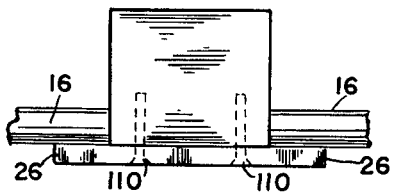
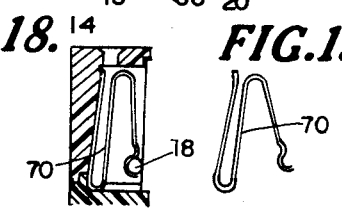
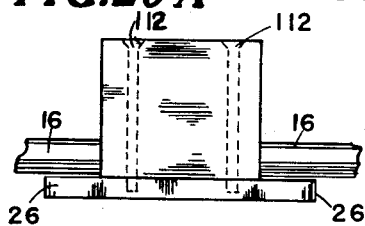
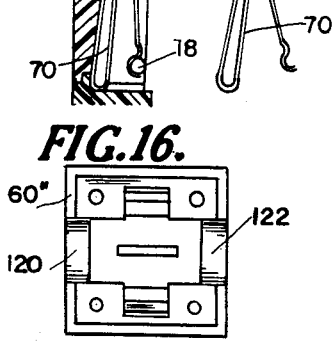
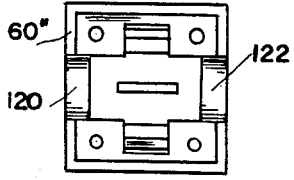
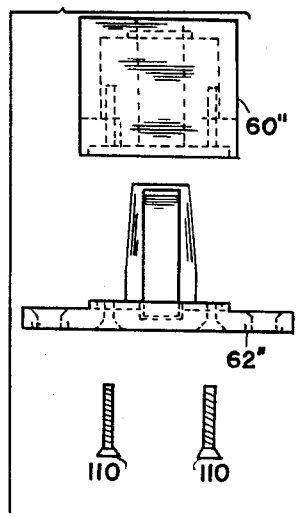
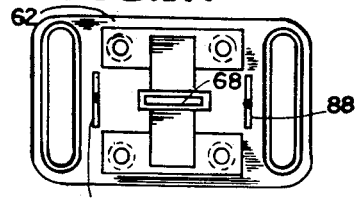

Feb. 20, 1962  S. N. BUCHANAN  3,022,485
ELECTRICAL WIRING UNIT
Filed Oct. 8, 1956  4 Sheets-Sheet 4

INVENTOR.
Stephen N. Buchanan
BY
Cushman, Darby & Cushman
Attorneys

United States Patent Office 3,022,485
Patented Feb. 20, 1962

3,022,485
ELECTRICAL WIRING UNIT
Stephen N. Buchanan, Washington, D.C.
(1514 N. Quincy St., Arlington, Va.)
Filed Oct. 8, 1956, Ser. No. 614,504
2 Claims. (Cl. 339—175)

This invention relates to electrical wiring units for attachment to cables for power, control and other purposes.

In electrical circuits particularly of the type common in lighting and appliance wiring in residential construction, there has come into existence a set of required components of unreasonable complexity and expense. For example, if it is desired to provide an outlet receptacle, it is necessary under existing practice to use a connector device for connecting the cable to an outlet box which is fixed to the wall or other structure. Then, a separate receptacle structure is provided, and the conductors from the cable must be stripped of insulation at the ends thereof and these bared portions of the conductors bent to encircle a screw-type terminal. After attachment of the conductors to the screw terminals on the receptacle, the latter must be pushed into the box with the conductors bent and twisted as necessary and the receptacle then fastened to the box. Then the cover is placed over the receptacle. The mounting of a switch is entirely analogous, requiring not only the switch, but the surrounding box, the separate connector of the box to the cable, then having to stuff the switch and the lengthy conductors into the box.

There has been recently developed and approved in all jurisdictions, a type of cable commonly referred to as the UF type. This is a cable having two or more conductors therein, the cable sheathing being of a flexible so-called "plastic" material. However, the advent of this cable has not been accompanied by the development of components for use therewith. Instead, the cumbersome boxes and separate units for stuffing therein, continue to be used, and there has only been some impractical modification of connection devices for connecting the new cable to the old style boxes. The development of wiring practices is further deficient in that no improvements have been offered to reduce the size of the boxes and units for mounting therein, and as a consequence, any outlet or switch point must be seated in a large opening in a wall or baseboard.

In accordance with the present invention, an improved type of electrical wiring unit is provided, particularly of the receptacle type, which is extremely compact in size so as to permit mounting in walls, or along chair rail mouldings or baseboard mouldings. The design of unit is, as will become apparent hereinafter, such that it may equally well be mounted on the exterior of a wall or like surface, or may be mounted flush therein, in all cases with pleasing appearance and retention of safety features. The unit per se performs the functions now satisfied only by a surrounding box, cable connectors and separate receptacle or like device. For receptacles, it is unnecessary to sever the conductors of the cable; instead these can run directly through the unit and all tensile strength is preserved. No screw terminals or soldering is necessary for making positive contact with the conductors. The units consist only of two body portions which interfit together, plus contact members for extending between the conductors and the prongs of a plug when in place in the receptacle. Thusly, manufacturing costs are maintained at a minimum and labor required in installing the units is greatly reduced.

A primary object of this invention is, therefore, to provide improved units for electrical wiring circuits.

Another object of this invention is to provide a new type of electrical receptacle which shall not require the breaking of the conductor for connecting purposes, yet which shall enable the maximum current of the conductor to be drawn through this outlet and the operations normally involved in building wiring shall be reduced to a minimum, while the safety and current carrying capacity shall be held at a maximum.

A further object of this invention is to provide a novel type electrical outlet receptacle assembly which shall serve to eliminate the usual fire hazards as a consequence of loosening of the electrical connections and to provide a small, compact, economical and easily installed line of electrical fittings relating to this concept.

A further object of this invention is to provide an improved structure wherein relatively long conductors may be utilized and a plurality of the novel attachment plug receptacles may readily be connected at frequent intervals, or may readily permit the installation of additional receptacles in sufficient number, so as to provide available electric outlets at substantially any desired point within a room.

It is a further object of this invention to provide a duplex receptacle connector assembly which may be used as a connector means for splicing line wires.

It is a further object of the invention to provide end closure means within which the exposed terminals of an electrical conductor unit are housed in mutually spaced insulated relationship and retained therein in a fixed and firm position.

It is a further object of the present invention to provide end closure means for a unit of an electrical wiring system which will be inexpensive to manufacture and will afford full protection for the conductors of such a unit.

A further object of this invention is to enable the rapid and effortless replacement of the spring contacts without removing the unbroken conductor wires from their position within the receptacle. Further, the connector wires may be removed without disturbing the spring contacts.

Another object of this invention is to provide a spring contact with a substantially U-shaped portion which will grip a plug prong on two sides with the maximum possible pressure.

Another object of the invention is to design a receptacle that has equalizing spring contacts designed to give equal pressure on conductor wires and plug when the plug is inserted. To insure maximum pressure on the wire the contacts are formed in such a manner that the insertion of the plug prongs will displace the contact ends with serrated contact grooves and cause these grooves to bear more firmly against the wire and at the same time causing a "wiping action" of the groove serrations against the wire, providing a penetrating action to insure proper contact with the wire through any dust or film which might accumulate.

Another object of this invention is to provide electrical outlet attachment means embodying improved spring metal contacts, secured to electric conductors in a manner retaining the spring qualities of the contacts.

Another object of this invention is to provide a new type of electrical receptacle which shall be complete in itself and not require additional fittings for assembly, such as boxes, box connectors, box covers and terminal screws.

Further objects will become apparent from the following detailed description of illustrative embodiments of the invention and from the appended claims.

The illustrative embodiments may be best understood by reference to the accompanying drawings, wherein:

FIGURE 1 shows a receptacle unit according to the invention.

FIGURE 2 shows the unit of FIGURE 1 mounted on an exterior surface.

FIGURE 3 shows the unit of FIGURE 1 flush mounted.

FIGURE 4 shows the unit of FIGURE 1 flush mounted on a member of different thickness.

FIGURE 5 shows a unit flush mounted and supported from the front surface of the mounting structure.

FIGURE 6 shows a cross-sectional view along the line 6—6 of FIGURE 3.

FIGURE 7 shows a top view of the structure of FIGURE 6 with top portion removed.

FIGURE 8 shows a vertical cross-section along the line 8—8 of FIGURE 7.

FIGURE 9 shows the unit of FIGURE 6 with a plug inserted.

FIGURE 10 shows a contact employed in the unit of FIGURE 6.

FIGURE 11 shows another view of the contact of FIGURE 10.

FIGURE 12 shows a modified contact member.

FIGURE 13 shows modification of a unit body structure with respect to the preceding units.

FIGURE 14 shows another modification of unit body structure.

FIGURE 15 is an exploded view of the unit of FIGURE 14.

FIGURE 16 is a bottom view of the upper body portion of FIGURE 14.

FIGURE 17 is a top view of the lower body portion of the unit of FIGURE 14.

FIGURE 18 is a further view of a contact in place in body structure similar to that of FIGURE 14.

FIGURE 19 shows a contact member in released configuration.

FIGURE 20 shows one manner of mounting the lower body portion to the upper body portion of a unit according to the invention.

FIGURE 20A shows another arrangement for affixing the body portions together.

Figure 21:
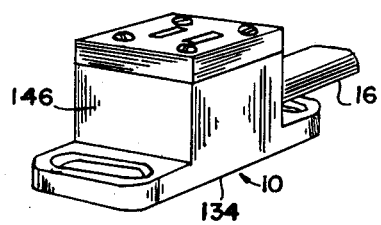
FIGURE 21 shows a receptacle unit for terminating a cable.

FIGURES 1-4 illustrate a primary embodiment of the invention. Reference character 10 generally designates a body portion of a receptacle which is characterized by having a surface 12 with openings 14 therein for receiving the spaced prongs of an electrical plug of the conventional variety. Electrical cable 16, the UF type being illustrated, having conductors 18 and 20, enters the body 10 at a point 22 which is intermediate the surface 12 and the bottom 24 of the body. Cable 16 at least in the immediate vicinity of the entry points, lies in a plane substantially parallel to the surface 12. Attention is drawn to the entry of the cable 16 at 22, substantially at the bottom of the body 10. The member 60a of the body serves to form a clamp upon the cable, as will be described further hereinafter.

In FIGURES 1-4, the body is provided with laterally extending ears 26 having slots 28 therein for use in some cases for affixing the receptacle to a mounting surface. In these figures, ears 26 extend from the body 10 in the direction of the cable 16, but it will be understood that the ears could proceed in the direction at right angles thereto. In FIGURE 1 the receptacle is shown unmounted, but in FIGURE 2 is mounted to a member such as a wallboard 30 having an exposed surface 32. Another form of a panel or the like 34 is shown in FIGURE 3, presenting surface 32, and in FIGURE 4 a panel 36 of lesser thickness presents the surface 32. It will be fully appreciated that these members 30, 34 and 36 may be chair mouldings, baseboards, etc.

Considering the unit as thus far described, and irrespective of further illustrated details which will be subsequently explained, several important features of the invention already become apparent. Firstly, the receptacle is extremely compact. For the most conventional plug having two prongs spaced apart one-half inch and about three-fourths inch long, the body 10 can be a square one inch on a side viewed downwardly as in FIGURES 1-4, and little more than one inch overall in the illustrated vertical direction. As will be hereinafter explained in greater detail, the sheathing of cable 16 is firmly clamped to the body, and no auxiliary boxes or the like are required. The receptacle is equally well adapted for mounting on the front surface of a panel or other member, as shown in FIGURE 2, or flush mounted as shown in FIGURES 3 and 4. In construction practices in the United States, wallboards are predominantly either of three-eighths inch thickness or one-half inch thickness. If panel 34 of FIGURE 3 is taken to be one-half inch in thickness, the fact that cable 16 enters the receptacle near the bottom of body 10, permits the dimension of the body to be such that the surface 12 of the receptacle can be flush with the front surface 32 of the panel, and a cover plate 38 affixed to the surface 12 will firmly sandwich the panel 34 between said cover plate and the cable 16. By having ears 26 extend in the direction of the cable, some support for the cable is provided for this sandwiching purpose, which is an advantage over having the ears extend otherwise, which might then permit some shearing action as at point 40 (FIG. 3). The same vertical dimension of the body 10 as shown in FIGURE 3 may be used for three-eighths inch thickness panel board, as may be considered to be illustrated in FIGURE 4 by panel 36. In this case, a washer or wafer 42 may be slipped over the body 10 above the cable 16, or even beneath the cover 38 at the front surface 32 of the panel, to take up the one-eighth inch difference.

While the receptacle is thusly adapted for flush mounting, FIGURE 2 emphasizes that where external mounting is necessary or desirable, the same feature of entry of the cable 16 near the bottom of the body 10, presents the best and most pleasing situation for external mounting. That is, the receptacle may be mounted as by use of screws 44 through ears 26 and still the cable 16 is substantially on the surface 32, requiring only slight bending over beyond the ears 26 to lie flat against said surface.

By the organization as described, an extremely compact and self-contained receptacle is provided, and by virtue of the arrangement of the direction of and position of entry of the cable thereinto, one design of receptacle is equally adapted for exterior mounting (FIG. 2) or flush mounting and for differing thicknesses of panel or the like (FIGS. 3 and 4).

In FIGURES 3 and 4, the overall mounting in the aperture in the panels is accomplished by the action of the cover plate 38 on the front surface 32 of the panel and the action of the ears 26 to sandwich the panel and cable therebetween. It should be pointed out, however, that in some areas there is prejudice against mounting a receptacle by use of the cover plate. In such cases, a modification can be provided, as shown in FIGURE 5, whereby the ears 26 can be dispensed with and instead ears 46 be provided at the top of the body 10 for affixing the receptacle to the panel, here designated by reference character 48. A suitable cover 50 may then be provided having sufficient depression over its underneath side to accommodate the ears 46, and yet permit the edge 52 of the cover plate to meet the surface 32.

Features of construction according to the invention, and equally applicable to all of the embodiments heretofore described, will now be explained with reference to FIGURES 6-9. FIGURE 6 may be a cross-section of FIGURE 3 along line 6—6 thereof, but with the cover 38 removed. Conductors 18 and 20 are shown in cross-section, and it will be apparent that these conductors (with the insulation removed in this area) pass straight through the body 10. The body 10 is divided into a first body portion 60 and a second body portion 62. Portion 60 includes the openings 14 for receiving plug prongs, while portion 62 in the region disclosed in FIGURE 6 is characterized by chambers or wells 64 and 66. Well 64 is defined by wall 62a of portion 62, and one side of central barrier 68, while well 66 is defined by the inner surface of wall 62b of portion 62, and barrier 68.

Retained between the first and second body portions in the wells 64 and 66, are contact members 70. Taking the one in well 64 as an example, it is characterized by having a first end 72 bearing against the wall 62a, with a part then extending downwardly and then upwardly to form a U-shaped member, and then a part 74 extending downwardly to a cupped section 76 which bears against conductor 18. As shown in FIGURE 7, which is a top view of FIGURE 6 with the first body portion 60 removed, the second body portion 62 further defines wells 64 by posts 76. Each of these may have a screw-threaded hole 78 for receiving screws serving the purpose of maintaining the first body portion 60 thereon. However, other fastening means may be employed. Contact members 70 are to be observed in position in the chambers or wells 64 and 66 with conductors 18 and 20 to either side of barrier 68. The inner corners 76a of posts 76 are designated as such in FIGURE 6.

FIGURE 8 shows a vertical section through the embodiment of FIGURES 6 and 7, substantially along the line 8—8 of FIGURE 7, this view best showing the termination of the insulating sheathing of the cable 16 as at 80 and 82. Between these points the conductors 18 and 20 are stripped of insulation to make contact with the contact members 70. FIGURE 8 further shows the barrier 68 as extending in the direction of the cable 16, just the distance between points 80 and 82. While explaining barrier 68, it may also be added at this point that preferably the top part 68a thereof extends into a groove in the portion 60.

Referring to FIGURE 8 particularly, the first body portion 60 is provided with downwardly extending members 60a and 60b for engaging the top of the sheathing of cable 16 as at points 84 and 86, respectively. These parts may be further understood by noting part 60a so designated in FIGURE 1. The point of the second body portion 62 below points 84 and 86 are preferably provided with ridges 88 to cause indentation into the cable sheathing, thereby additionally resisting longitudinal movement of the sheathing under any strain that might exist.

Preferred form units according to the invention may be constructed entirely of so-called insulating materials, to facilitate manufacture thereof as by moulding, and at the same time preventing electrical short-circuiting between the conductors, contact members and the like. Of course, some parts of the units may be constructed of conductive material, so long as suitable insulation is provided as required. For example, the mounting ears 26 or 46 (FIG. 5) may be of metal and suitably affixed to the remainder of the unit.

It will also be appreciated that lengthwise movement of the cable 16 is further resisted by virtue of the fact that the barrier 68 engages the termination of the insulation at points 80 and 82, and, of course, the conductors 18 and 20 remain intact and provide their full tensile strength.

Referring now to FIGURES 6 and 9, the action of the prongs 90 and 92 of a plug 94 on the contact members 70 will be explained. With the particular design of contact 70 shown in these figures, initially the U-shaped part lies outwardly and downwardly divergent, as shown in FIGURE 6, and it should be noted that there is clearance between the upper part of section 74 of contact 70 and the barrier 68. Referring to the left-hand side of FIGURE 9, as an example, insertion of prong 90 causes the U-shaped portion of contact 70 to shift to the right. This obviously causes considerable pressure to be exerted upon the right-hand side of the prong, and meanwhile, pressure is also exerted upon the left-hand side of the prong, due to the fact that the prong will be somewhat thicker than the original dimension between the arms of the U-shaped portion. Thus, a firm grip on both sides of the prong is effected. The insertion of the prong has the further action of causing the cupped part 76 of the contact 70 to rotate considerably in a clockwise direction about the conductor 18. Compare FIGURES 6 and 9 to see the clearance between section 74 of contact 70 and barrier 68 to have decreased. The cupped section 76 may be scored on its inner surface, as shown at 76a in FIGURE 10. The result is that each time the prong is inserted and removed, some rotation and a cleaning action of the contact and conductor occurs.

For further clarity, the contact 70 per se is shown in FIGURES 10 and 11. Conventional plugs are provided with the prongs having apertures near the lower end thereof, and the contact 70 may be provided with the usual dimpled area 76b for seating in the prong aperture. There may be another of these, 76c, if a cover plate 38 may or may not be used, to provide a dimple for each maximum plug insertion distance.

It is realized that contact members for receiving a prong at one place and bearing against a conductor for rotation thereon at another place have been previously described. However, the present configuration as just explained, and embodiments further explained hereinbelow, offer unique advantages not found in the prior art devices. It is believed that the provision of a full U-shaped portion for receiving the prong, combined with substantially a second inverted U-shaped portion so that engagement is made with the conductor near the bottom of the receptacle, is novel. It is emphasized that this configuration gives positive rotation over a wider arc than has heretofore been known. Additionally, the configuration as shown herein, permits the conductors of the cable to pass straight through the receptacle near the bottom thereof, which is the most desirable location for reasons explained with regard to FIGURES 1-5 above.

FIGURE 12 shows a further embodiment of my contact member, this contact, designated 100, being characterized by its first end 102 bearing against the restraining wall midway of the vertical length thereof, and with the bottom of the U-shaped portion being flared outwardly and resting at point 104 on the bottom of the well.

The compactness of the unit afforded by my arrangement of cable entry in relation to the openings for receiving the plug prongs is to be emphasized. With particular reference to FIGURES 6-9, but with these comments applying equally to the other embodiments for type UF cable, to which the invention is particularly adapted, the conductors of this type cable in its two-conductor form, with or without a third uninsulated ground wire (not shown) are one-fourth inch apart. The conventional plugs have prongs one-half inch apart. Accordingly, by so arranging the prong openings 14, the aligned contact members 70, and the barrier 68, by my invention, the ultimate in compactness is achieved. As best shown in FIGURES 6 and 9, the barrier 68 may be such as to occupy the spacing between the innermost points of the conductors 18 and 20 which are thus astride of the barrier, while the U-shaped portions of the contact member 70 at their lowermost points may be found outside of and astride the barrier and conductors. Therefore, the prongs of the plug when fully inserted may extend a distance equal to or beyond the position of the conductors, thereby permitting full prong insertion and a long contact area between the prongs and contact members, without the unit having to be of a depth much greater than the distance of prong insertion. The desirability of having the cable enter the unit near the bottom thereof has been previously mentioned and the entire assembly is such that the entire width of the unit need be little more than the prong spacing plug desirable thickness of the side walls and some clearance for movement of the contact members to align with the plug prongs. For plugs having one-half inch spacing between prongs, the lateral dimension of the unit, therefore, need be only about one inch. For prongs three-fourths inch in length, the entire depth of the unit, including cover plate 38 where employed, need be only about one inch. As for lengthwise dimension, again for a single receptacle outlet, this dimension need be no more than one inch. Of course, it is obviously possible, as mentioned further hereinbelow, that the length can be multiplied to provide a multiplicity of outlets as desired, but only about one inch per outlet position is required.

It is now apparent that the constructional embodiments heretofore explained permit easy assembly of the cable into the receptacle. Assuming the second body portion 62 available with the first body portion 60 removed, and with a cable having the conductors bared for the correct distance, in a first case the cable can be slipped into the second body portion 62, and then the contact member 70 can be inserted in the wells 64 and 66, and the cupped portion 76 caused to overlie the conductors. In an alternative case, the contact members 74 may be first placed in the wells, and then the cable slipped into the body portion 62, the conductors again coming to rest in the cupped portions 76 of the contacts.

It will be apparent that various functions of the first and second body portions can be interchanged. For example, as shown in FIGURE 13, and comparing to FIGURES 6–9, the first body portion here designated 60' could have the side wall heretofore designated as 62a and 62b an integral part thereof, and the barrier 68 also an integral part of the first body portion. The second body portion here designated 62' would then appear as in FIGURE 13, with the barrier 68 entering a groove therein similar to the groove 68a (FIG. 8). The contact member could be substantially the same as that of FIGURES 6–9, or FIGURE 12, but in this case should have a flared end 70' to insure that the cable, if entered after the contact member 70, could be slipped upwardly to seat in the cupped section 76.

It will be understood that where a cover such as 38 of FIGURE 3 is employed, it will have openings therein aligned with the openings 14 of the first body portion 60, through which the prongs of the plug will extend. When the cover is used, the prongs will not extend quite so far into the receptacle, as determined by the thickness of the cover. Of course, a particular line of receptacles can be designed if use of covers is planned upon, and prong insertion can then be exactly the same in terms of seated position within the contact members 70.

As shown in FIGURE 14, a modification over and above FIGURE 13 is to have the sides of the receptacle arranged in accordance with FIGURE 13, but with the barrier 68 in this case affixed to the second body portion. In this arrangement, the cable will be entered from above, however.

FIGURE 15 shows an exploded view of an upper body portion here designated 60'', a lower body portion here designated 62'', both in accordance with FIGURE 14, and with screws 110 for affixing these portions together. FIGURE 16 shows a bottom view of the first body portion 60'' shown in FIGURE 15 and FIGURE 17 shows a top view of the lower body portion 62'' of FIGURE 15. Ridges 88 are shown in FIGURE 17, for engaging the cable sheathing and in FIGURE 16 regions 120 and 122 serve to engage the upper sides of the cable 16, as do the members 60a and 60b of FIGURE 8.

As shown by FIGURES 18 and 19, the contact members 70 in relaxed position are to be as shown in FIGURE 19, so that the contact is considerably pre-stressed when in place in its retaining well in the receptacle, even prior to the insertion of a plug prong.

FIGURE 20 serves to show that the lower body portion may be affixed to the upper body portion by screws 110 extending upwardly, or in FIGURE 20A by screws 112 extending downwardly through the vertical dimension of the receptacle, into the lower body portion.

Figure 22:
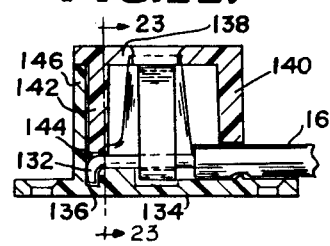
FIGURE 22 shows a vertical cross-sectional view of the unit of FIGURE 21.
Figure 24:
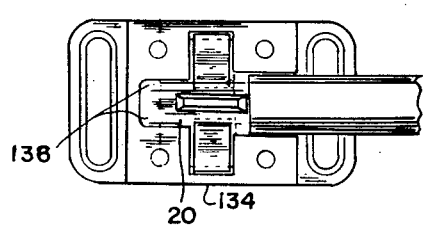
FIGURE 24 is a top view of the unit of FIGURE 21 with the upper body portion removed.
Figure 23:
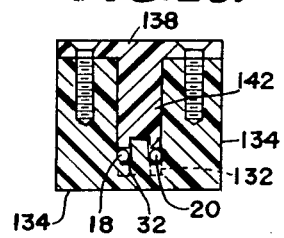
FIGURE 23 is a sectional view substantially along the line 23—23 of FIGURE 22.

For providing a receptacle at the end of a cable, a modification as shown in FIGURES 21–24 may be employed. Here the conductors are stripped of insulation for a distance from the ends as shown in FIGURE 22, and a short length 132 of the ends are turned at a sharp right angle. In the lower body portion of the receptacle, here designated 134, apertures 136 may be provided extending downwardly, these to receive the turned ends 132 of the conductors. The upper body portion 138 may have a downwardly extending part 140 comparable to the part 60a shown in FIGURE 1, for example, for clamping to the sheathing of the cable 16. However, at the opposite end there will be a downwardly extending part 142 of different length, so as to extend down a sufficient distance to engage the conductors as at 144, for causing the conductors to be positively retained in the apertures 136. The side of the receptacle opposite from the entry of cable 16 may be unbroken, as shown in FIGURE 21, by providing an upstanding wall 146 as shown in FIGURE 22, or the part 142 of the upper body portion 138 may be suitably extended to serve this purpose. I have discovered that the sharp angulation of the conductors as at ends 132, positively seated in the apertures 136, will retain the conductors in the receptacle against lengthwise pull, beyond the tensile strength of the conductors.

It will be apparent that if it is desired to have a multiple outlet receptacle the components of the single outlet receptacles thus far described can be multiplied along an elongated receptacle body, with the conductors extending continuously therethrough.

An important feature of the invention, as already described, is the point of entry of the cable near the bottom of the unit, in a plane substantially parallel to the utility surface of the unit, to permit versatile mounting either on a surface, as in FIGURE 2, or flush mounting as in FIGURES 3–5, etc.

It will be understood that the detailed embodiments of the invention which have been illustrated and described in detail, are only for purposes of explanation, and the true scope of the invention is to be determined by the appended claims.

What is claimed is:

1. In an electrical receptacle comprising means for receiving an elongated conductor and the prong of a plug for effecting electrical connection therebetween, a body having a chamber therein, a contact member in the chamber, the body having means defining an opening for insertion of the prong into the chamber, the contact member having one end bearing against one side of the chamber, the contact member then extending in a direction away from said opening and then back towards said opening to form a U-shaped portion to embrace an inserted prong, and then extending over and in a direction away from the said opening to its other end whereat is provided a portion adapted to bear against the conductor in the chamber, the bottom of the U-shaped portion of the contact member being positioned at substantially the same depth in the chamber as is the conductor, and wherein the conductor lies inwardly of the U-shaped portion of the contact member.

2. An electrical receptacle unit comprising a first body portion and a second body portion for inter-fitting together to form said unit, the body portions being arranged to provide when fitted together a central chamber, one of the body portions having a surface with openings therein for receiving the prongs of a plug for insertion into said chamber, the depth of the chamber being little more than the insertion distance of the prongs, the first and second body portions including complementing areas defining an opening to either side of the unit for passing the sheathing of a cable therethrough and being arranged to exert a clamping force upon the cable sheathing when the body portions are fitted together, the position of the openings being such as to align the cable and conductors thereof to pass through the chamber adjacent the bottom thereof and between the inserted prongs, barrier means extending from one of the body portions and positioned within the chamber to extend between the prongs and between the conductors therebetween, and contact means in the chamber to either side of the barrier, each contact means at one end having a portion engaging a bared section of the conductor, each contact means then having a portion extending in a first direction toward the prong receiving surface and over, and then in the opposite direction and then in the first direction to form a U-shaped section for embracing an inserted prong, and then extending to engage the outer wall of the chamber, the overall arrangement being such that the U-shaped section of each contact member is provided for positively and resiliently engaging the plug prong, while permitting a considerable length of unrestrained contact member to extend from the vicinity of the plug prong to the point of engagement with the conductor thus providing maximum resiliency and rotational action on the conductor with the maximum required dimension of the unit transverse to the direction of the cable being little more than the prong spacing and the dimension of the unit in the direction of prong insertion being little more than the distance of said prong insertion.

References Cited in the file of this patent

UNITED STATES PATENTS

| | | |
|---|---|---|
| 748,445 | Wagner | Dec. 29, 1903 |
| 1,618,909 | Benjamin | Feb. 22, 1927 |
| 1,696,583 | Sargent et al. | Dec. 25, 1928 |
| 2,515,256 | O'Brien et al. | July 18, 1950 |
| 2,700,752 | Cataldo | Jan. 25, 1955 |

FOREIGN PATENTS

| | | |
|---|---|---|
| 496,893 | Belgium | July 31, 1950 |